(12) United States Patent
Philipps et al.

(10) Patent No.: US 7,245,386 B2
(45) Date of Patent: Jul. 17, 2007

(54) OBJECT MEASURING DEVICE AND ASSOCIATED METHODS

(75) Inventors: Jürgen Philipps, Aachen (DE); Björn Lindner, Aachen (DE); René Beaujean, Aachen (DE)

(73) Assignee: Pixargus GmbH, Aachen (DE)

( * ) Notice: Subject to any disclaimer, the term of this patent is extended or adjusted under 35 U.S.C. 154(b) by 273 days.

(21) Appl. No.: 10/874,841

(22) Filed: Jun. 23, 2004

(65) Prior Publication Data

US 2006/0017935 A1      Jan. 26, 2006

(30) Foreign Application Priority Data

Jun. 24, 2003   (DE) ............................... 103 28 537

(51) Int. Cl.
   G01B 11/24   (2006.01)
(52) U.S. Cl. ..................... 356/601; 356/606; 356/623; 356/602; 250/559.2
(58) Field of Classification Search ........ 356/601–652; 250/559.2, 559.22, 559.24; 382/152, 286, 382/291
See application file for complete search history.

(56) References Cited

U.S. PATENT DOCUMENTS

| | | | | |
|---|---|---|---|---|
| 3,806,253 A | * | 4/1974 | Denton | 356/601 |
| 3,976,382 A | * | 8/1976 | Westby | 356/606 |
| 4,113,389 A | | 9/1978 | Kaye | |
| 4,373,816 A | * | 2/1983 | Laib | 356/623 |
| 4,583,857 A | * | 4/1986 | Grammerstorff et al. | 356/606 |
| 4,938,599 A | * | 7/1990 | Goszyk | 356/639 |
| 5,015,867 A | | 5/1991 | Siegel et al. | |
| 5,408,325 A | * | 4/1995 | Cruickshank | 356/612 |
| 6,064,759 A | | 5/2000 | Buckley et al. | |
| 6,094,270 A | * | 7/2000 | Uomori et al. | 356/623 |
| 6,428,171 B1 | * | 8/2002 | Aoki et al. | 356/634 |

FOREIGN PATENT DOCUMENTS

EP   0 330 429 A   8/1989
GB     395 649 A   7/1933

OTHER PUBLICATIONS

Bouguet, Jean-Yves and Pietro Perona; 3D Photography on Your Desk; IEEE, Reprinted, with permission, From Proc.; International Conference On Computer Vision, Bombay, India; pp. 1-8; Jan. 1998.
Fischer, Jan; Haasz, Valdimir; and Radil, Thomas; Simple Device for Small Dimension Measurement Using CCD Sensor; 12th IMEKO TC4 International Symposium, Electrical Measurements & Instrumentation; Zagreb, Croatia, 5 pages, Sep. 25-27, 2002.
Kim, Jiwon and Wu, Jia-Chi; Scanning with Shadows (CSE 558 Project); [retrieved May 29, 2003] Retrieved from Internet: http://www.cs.washington.edu/homes/jewu/cse558/shadow.html.

* cited by examiner

*Primary Examiner*—Sang H. Nguyen
(74) *Attorney, Agent, or Firm*—Lathrop & Gage LC

(57) ABSTRACT

A device for measuring one or more dimensions of an object. One or more light emitters direct light towards the object. At least one light blocking element, arranged between the light emitters and the object, blocks all but a bundle of light to form a light edge on the object. At least one sensor captures an image of the light edge, wherein the dimensions may be determined from image data of the sensor. The object and/or device may move relative to one another, along an axis, to change measurement location of the object.

49 Claims, 10 Drawing Sheets ns of an object.
OBJECT MEASURING DEVICE AND ASSOCIATED METHODS

RELATED APPLICATIONS

This application claims priority under 35 U.S.C. § 119 to German patent application DE10328537A1, filed on 24 Jun. 2003 and incorporated herein by reference.

BACKGROUND

The prior art is familiar with certain techniques that determine the dimensions of an object without physical contact to the object. For example, U.S. Pat. No. 6,064,759 shows a method for measuring structural detail of an object. A laser is arranged at an angle to the surface of the object and a recording device is employed at normal incidence to the surface. An image of the object is analyzed using known methods of image processing.

Three-dimensional measurement methods include an illumination technique disclosed in U.S. Pat. Nos. 4,645,348 and 4,846,577. In this technique, a "pattern projector" projects light through a mask, creating a light pattern on a surface of an object. A sensor, normally a CCD or CMOS camera, detects the pattern on the object, and the object contour is reconstructed using known triangulation methods. However, this technique results in a significant perspective distortion, rendering a projected light pattern that is not sharp.

At the "International Conference on Computer Simulation," held in January 1998 in Bombay, India, Jean-Yves Bouguet and Pietro Perona disclosed a method of three-dimensional detection of objects based on "moved structural light". This method projects an image of a rod-shaped shutter by introducing an oblong shutter body into the beam of a light source. In connection with this method, the illumination method disclosed in U.S. Pat. No. 6,529,627 is used for three-dimensional modeling of an object by using a light source that is inclined at an angle to the object, or shifted to a region of interest of the object, instead of using the shutter body. According to the method of Bouguet and Peron and U.S. Pat. No. 6,529,627, in addition to illuminating the object, movement of the shutter body or the illumination source is at a right angle to the illumination direction, so that the surface of the object is swept by the illuminating rays once per time period. Parallax effects are detected with two walls in the background of the object, which are arranged at a right angle with respect to each other. The parallax effects are taken into consideration during a correction when triangulation is performed. However, a corresponding correction with the help of background walls is required; thus the movement necessitates complex synchronization. Moreover, the method of Bouguet and Perona does not result in detailed measurements because the shutters do not provide good contrast; this procedure is also not effective when applied to dark objects.

A perspective view of a device previously designed by the patent applicant hereof, to measure the dimensions of an object, is shown in FIG. 1. The device of FIG. 1 is based on projection of light from a laser 91 in a plane E4 intersecting a surface 95 of an object 94. Plane E4 is at a right angle with respect to an axis 93 along which object 94 is moved longitudinally relative to the laser (or vice versa). In FIG. 1, object 94 is a part of an "endless profile," that is, an object being manufactured in strip or sheet form. A laser line 96 forms at the intersection of laser plane E4 with surface 95. A CCD camera 92, arranged at an angle to axis 93, obtains an image of laser line 96 so that a contour of object 94 can be calculated based on distortion of laser line 96, using image processing such as triangulation.

A device similar to that shown in FIG. 1, including a laser and a CCD camera, can perform a panoramic measurement of an object. For example, the device can measure in several directions orthogonal to an axis in which the device advances relative to the object. However, factory alignment and calibration of laser(s) is time-consuming and thus expensive; safety regulations also apply to many laser based devices, further increasing their cost.

SUMMARY OF THE INVENTION

In one embodiment, an object measuring device measures one or more dimensions of an object. One or more light emitters direct light towards the object. At least one light blocking element, arranged between the light emitters and the object, blocks all but a bundle of light to form a light edge on the object. At least one sensor captures an image of the light edge, wherein the dimensions may be determined from image data of the sensor.

In another embodiment, a method measures dimensions of an object, including: emitting light from one or more light emitters; blocking a portion of the light such that a bundle of light illuminates a light edge on the object; imaging the light edge to at least one optical sensor; and processing image data from the optical sensor to determine the dimensions.

In another embodiment, a process measures dimensions of an object. Either an object or an object measuring device is moved along an axis of movement. Light is generated from the object measuring device and a portion of the light is blocked so that a bundle of light illuminates the object to form a light edge on the object. The light edge is imaged to an optical sensor of the object measuring device. Image data from the optical sensor is processed to determine the dimensions.

DETAILED DESCRIPTION OF DRAWINGS

Figure 2:
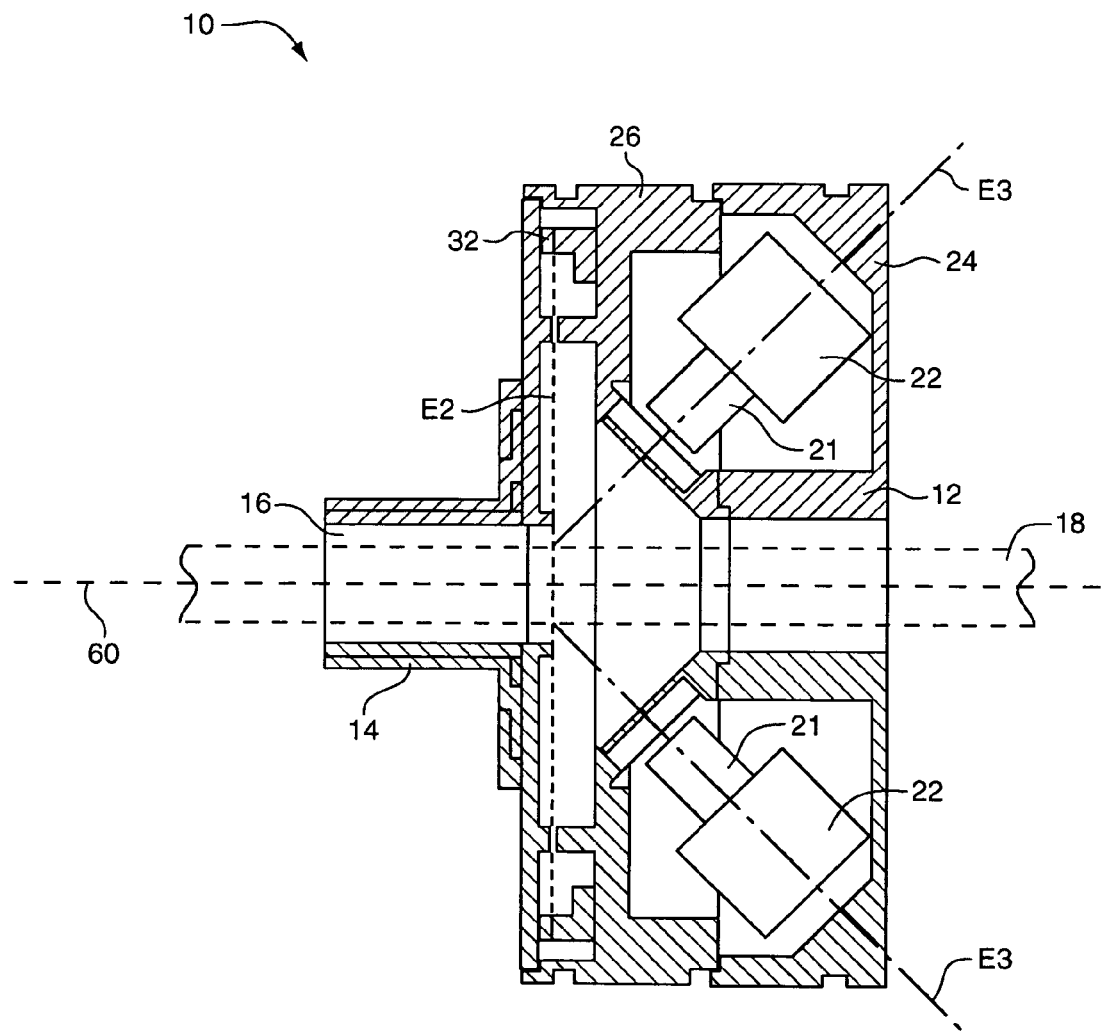
FIG. 2 is a cross-sectional view of one object measuring device and an object to be measured.

FIG. 2 is a cross-sectional view of an object measuring device 10 and an object 18 to be measured. A housing 12 of device 10 is disposed about an axis 60; it has a passageway 16 that extends parallel to axis 60 so that object 18 may extend therethrough, as shown. Object 18 may move along axis 60 relative to device 10; alternatively, device 10 may move along axis 60 relative to a object 18; or both object 18 and device 10 may move to perform dimensional measurements described hereinbelow.

Object measuring device 10 includes one or more light emitters 32 and one or more sensors 22. Each light emitter 32 is, for example, a light emitting diode (LED), such as shown and described in connection with FIG. 7. Each sensor 22 is, for example, an array of CCD or CMOS detector elements. An optical device 21, such as an objective lens, may be used to form an image for each sensor 22. Each combination of optical device 21 and sensor 22 may therefore comprise a digital camera.

In operation, light emitters 32 of object measuring device 10 illuminate a surface of object 18 with a light edge L (FIG. 5) that forms a contour with object 18 in a cross-sectional plane. Optical device 21 images light reflected from edge L to sensor 22, which converts image data to electrical signals; these signals are processed through triangulation to determine the dimensions of object 18. The terms "reflect" and "reflection" as used herein are not limited to specular reflection, and may also include scattering of light. To reduce influences of stray light, optical devices 21 may include color filters (not shown) that are matched to emissions by light emitters 32.

Figure 3:
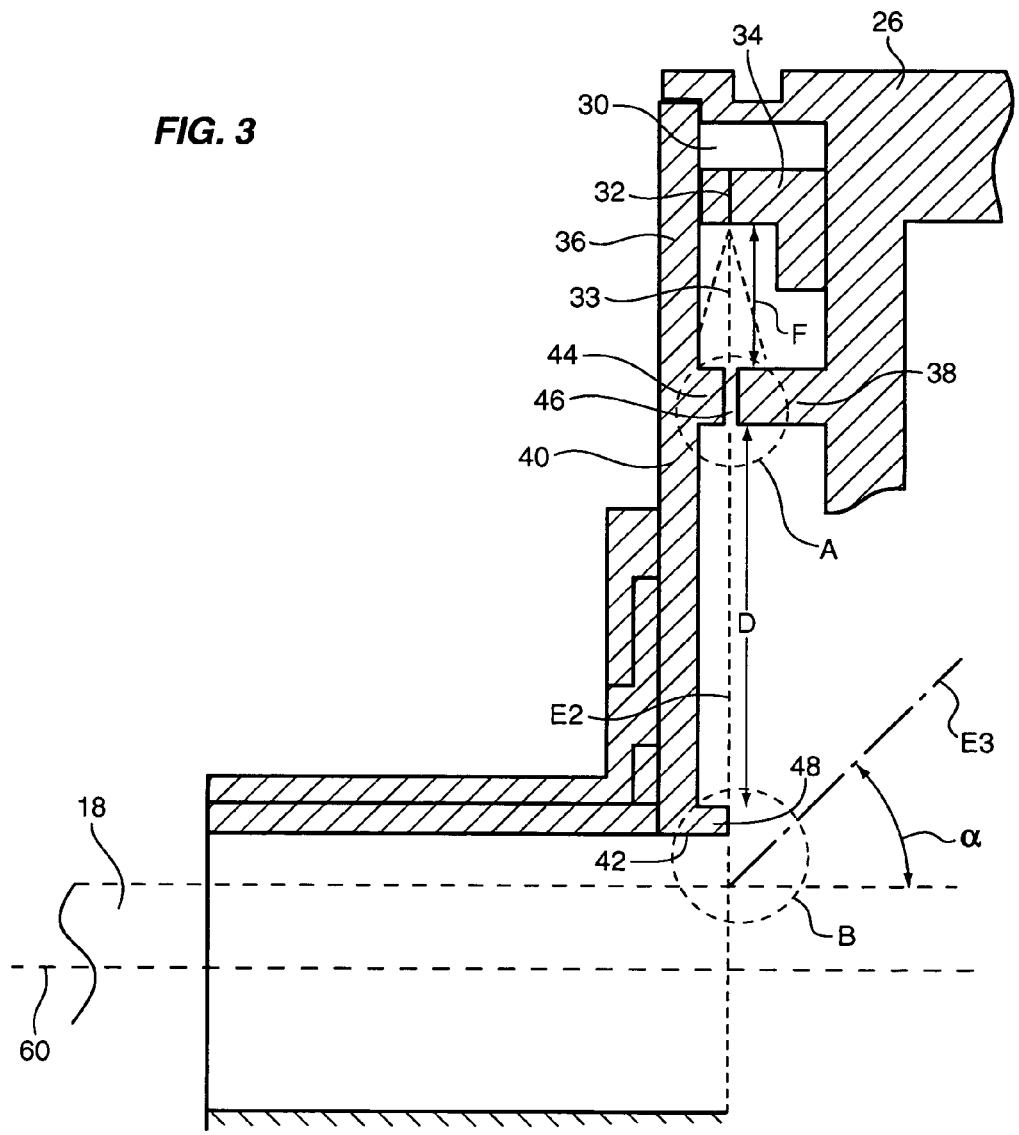
FIG. 3 is an enlarged partial view of the object measuring device of FIG. 2.
Figure 4:
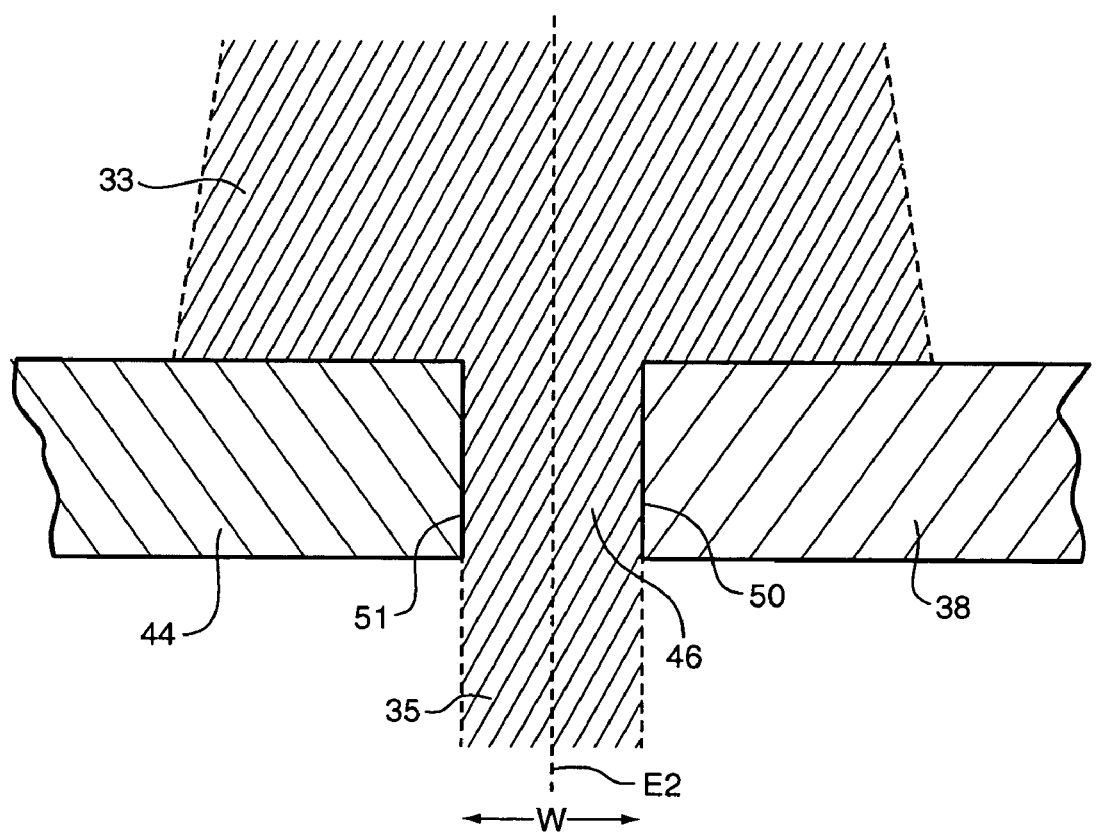
FIG. 4 is an enlarged view of region A of FIG. 3.
Figure 6:
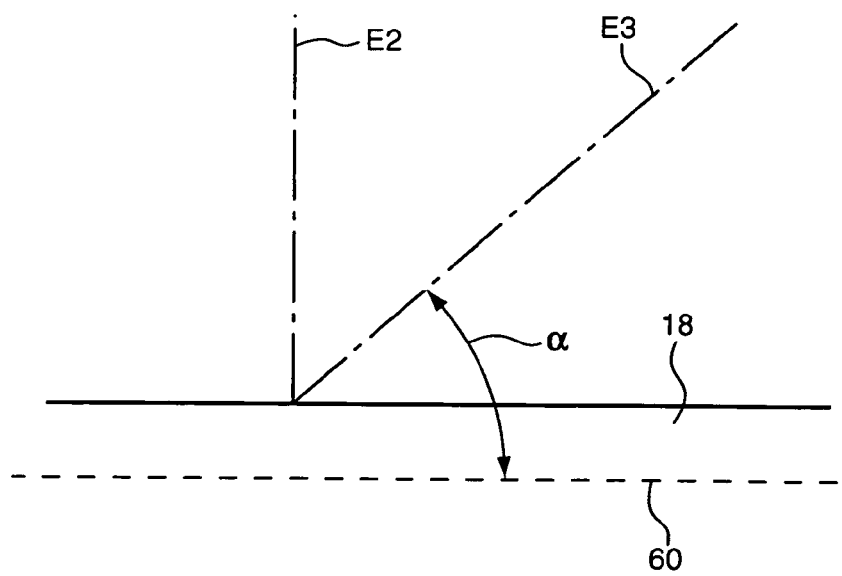
FIG. 6 shows one angular orientation between an illumination line of sight and a detection line of sight, for use in the object measuring device of FIG. 2.

The following description may be read in combination with FIG. 3, FIG. 4 and FIG. 6. Each sensor 22 and optical device 21 attach to housing 12 so as to form a line of sight between light edge L and sensor 22 (for purposes of illustration, only a center line of sight E3 between light edge L and sensor 22 is shown within FIG. 2, FIG. 3 and FIG. 6; this center line of sight E3 for example corresponds to a line of sight between a central detector element of sensor 22 and light edge L). Line of sight E3 thus forms a geometric relationship with axis 60. FIG. 6 shows one exemplary relationship wherein line of sight E3 is at an angle α (e.g., 45 degrees) with respect to axis 60.

Similarly, light from light emitters 32 is formed by light rays illmuninating object 18. For purposes of illustration, a center light ray E2 between light edge L and a center of a single light emitter is shown within FIG. 3, FIG. 4 and FIG. 6; this center light ray E2 for example corresponds to a light ray between a single light emitter and light edge L. As described in more detail below, light from light emitters 32 is aligned by light blocking elements to form a bundle of light coincident with center light ray E2. This bundle of light forms a light edge L (FIG. 5) on object 18 that reflects (and/or scatters) along line of sight E3 to each sensor 22. In one embodiment, an edge 41 (which in this example includes center light ray E2) of the bundle of light is perpendicular to axis 60 in the plane shown in FIG. 5. As illustrated, the line of sight E3 thus forms an oblique angle with light ray E2.

In one embodiment, a plurality of light emitters 32 are disposed about object axis 60 such that light edge L forms about object 18 for viewing by a plurality of sensors 22 (each sensor 22 with a corresponding optical device 21). In the example of FIG. 2, four such sensors 22 are disposed symmetrically about central axis 60 (though only two sensors 22 are shown for purposes of illustration). This arrangement of four sensors 22 ensures that light edge L, radially incident upon object 18 from light emitters 32, is imaged by each sensor 22. Mounting devices may also be used to facilitate adjustment of sensors 22, to match an angle of inclination of the sensors relative to axis 60 according to different sizes of objects 18. The adjustment of the inclination angle is for example performed in connection with calibration of object measuring device 10, before measurements are taken. In view of the foregoing, it should be apparent that object measuring device 10 may employ a different number (e.g., 8) of sensors 22 to determine dimensions of object 18.

In one embodiment, housing 12 has a cover 24 that is mounted on a central portion 26 of housing 12, to cover and protect sensors 22. Cover 24 may be removed for access to sensors 22, e.g., for maintenance purposes or to change the inclination angle of mounting devices for sensors 22.

FIG. 3 is an enlarged partial view of the object measurement device of FIG. 2. Central portion 26 includes a recess 30 to accommodate attachment of light emitters 32. For example, light emitters 32 may be part of a pedestal device 34 (see FIG. 7) that mounts within recess 30. In pedestal device 34, a plurality of light emitters 32 in the form of LEDs are mounted in radial holes. In the illustrated embodiment of FIG. 7, pedestal device 34 is circular so that light emitters 32 extend about axis 60. Recess 30 of central portion 26 may be closed in the longitudinal direction with an upper flange plate 36 so that recess 30 is protected from environmental influences such as, for example, dust, contaminants and external stray light.

Figure 5:
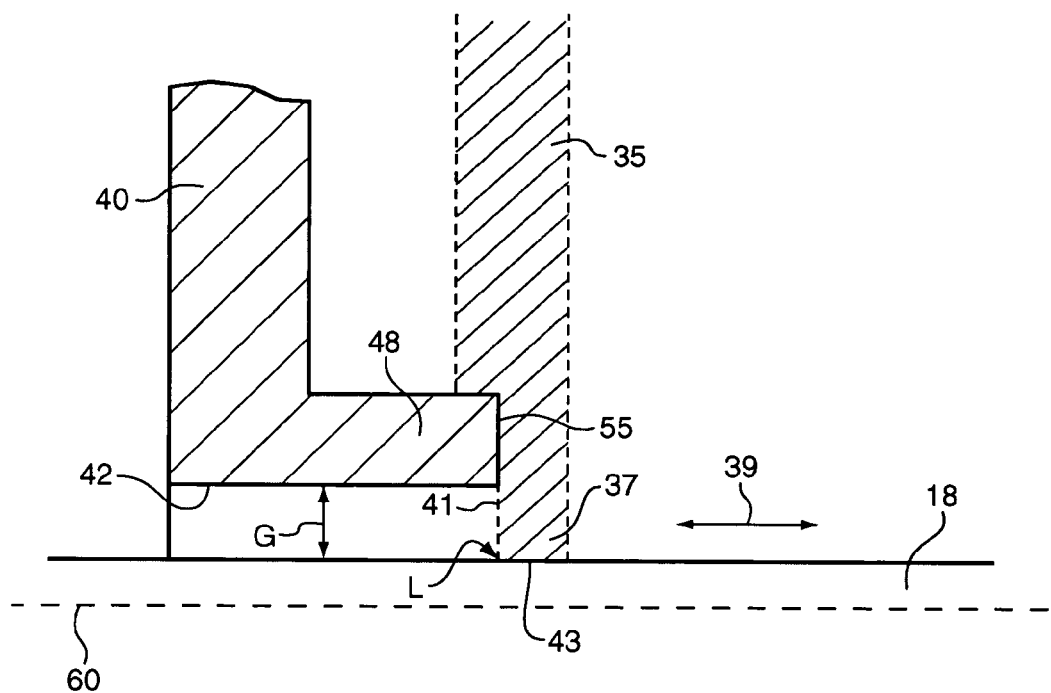
FIG. 5 is an enlarged view of region B of FIG. 3.

In one embodiment, and with respect to FIG. 3, FIG. 4, FIG. 5, central portion 26 includes a first light blocking element 38 that is parallel to axis 60. Housing 12 has a lower flange plate 40 that extends from upper flange plate 36 toward passageway 16 and ends at surface 42 adjacent passageway 16. Lower flange plate 40 is shown with a second light blocking element 44 that extends towards, and aligns with, first light blocking element 38. Lower flange plate 40 forms a third light blocking element 48, as shown. As described in more detail below, first, second and third light blocking elements 38, 44, 48 cooperate to block certain light rays from light emitters 32 so that the bundle of light (and light ray E2) forms light edge L on object 18.

For example, the separation between first light blocking element 38 and second light blocking element 44 forms a slit 46. A width W (FIG. 4) of slit 46 formed between first and second light blocking elements 38 and 44 is, for example, 1 mm. A distance D (FIG. 3) between first light blocking element 38 and third light blocking element 48 is, for example, 90 mm. A distance F from light emitters 32 to slit 46 may be, for example, 30 mm.

More particularly, FIG. 4 is an enlarged view of region A of FIG. 3. One end of first light blocking element 38 is a first edge 50, which, in this example, is perpendicular to axis 60. Second light blocking element 44 forms a second edge 51, which, in this example, is also perpendicular to axis 60. First light blocking element 38 and second light blocking element 44 may be constructed such that when housing 12 is assembled, slit 46 forms between first edge 50 and second edge 51. Slit 46 serves to aperture light 33 from light emitters 32 such that a bundle of light 35 passes through slit 46 along light ray E2. The width of the bundle of light passing through slit 46 is therefore W.

First light blocking element 38 and second light blocking element 44 may be adjustable to housing 12 so that the width W of slit 46 may be modified to match desired detection conditions.

Figure 9:
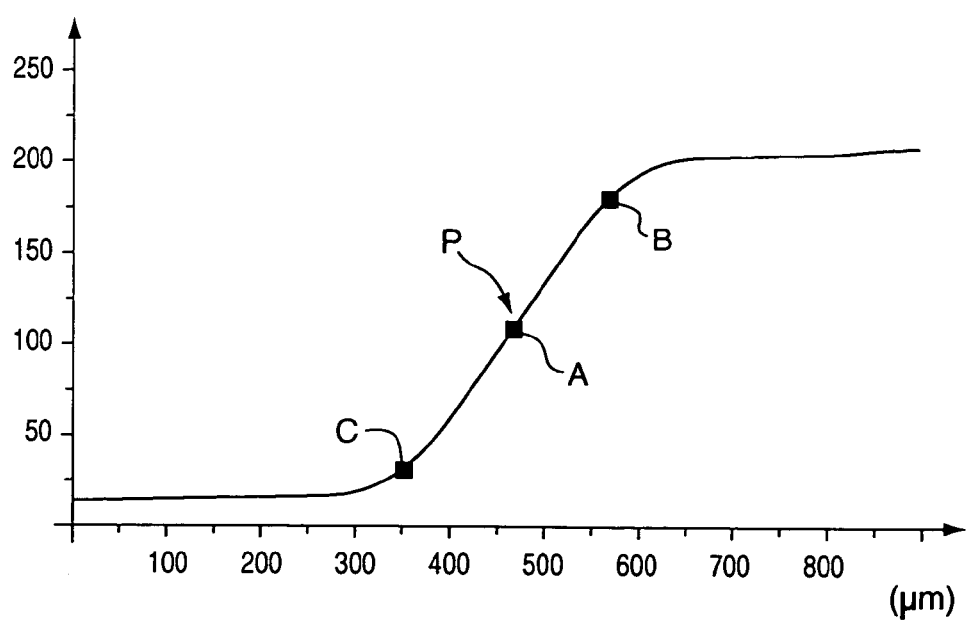
FIG. 9 is a graph of light intensity in a transition region of a light edge.

FIG. 5 is an enlarged view of region B of FIG. 3. As shown in FIG. 5 (not to scale), light blocking element 48 blocks part of bundle of light 35 such that only a smaller bundle of light 37 reaches object 18 to form light edge L. An edge 55 of light blocking element 48 may form a right angle to axis 60 to increase sharpness of light edge L. A graph of intensity of light edge L, versus position along axis 39, is shown in FIG. 9. Edge 55 may form a knife edge or other shape to block part of bundle of light 35 without departing from the scope hereof.

In one embodiment, the first and second light blocking elements are integrally formed by a common rigid structure (e.g., wherein the first and second light blocking elements are formed from a common piece of metal).

Sensors 22 are thus arranged along line of sight E3 such that light edge L is imaged to sensors 22 by optical devices 21. The arrangement may permit high precision dimensional measurement, particularly when data from multiple sensors 22 are combined and even if LEDs 32 are positioned within pedestal device 34 without precision alignment. That is, alignment of slit 46 with light blocking element 48 ensures that light edge L forms on object 18. Nonetheless, fine mechanical adjustments of pedestal device 34, slit 46 or light blocking element 48 may be made. Accordingly, housing 12 and lower flange plate 40 may be manufactured from aluminum or from cast metal or other materials.

The distance G between light blocking element 48 and the surface of object 18 may vary with the profile (or size) of object 18. G is for example selected such that light edge L forms even with variations in object size. An typical distance G is for example 70 mm, though in this example G may vary between 1 mm to 150 mm.

It should be apparent that light blocking element 48 may be positioned in a different location to form a light edge L on object 18 without departing from the scope hereof. As such, sensors 22 may be repositioned, if desired, in order to view light edge L without mechanical interference along line of sight E3.

Figure 7:
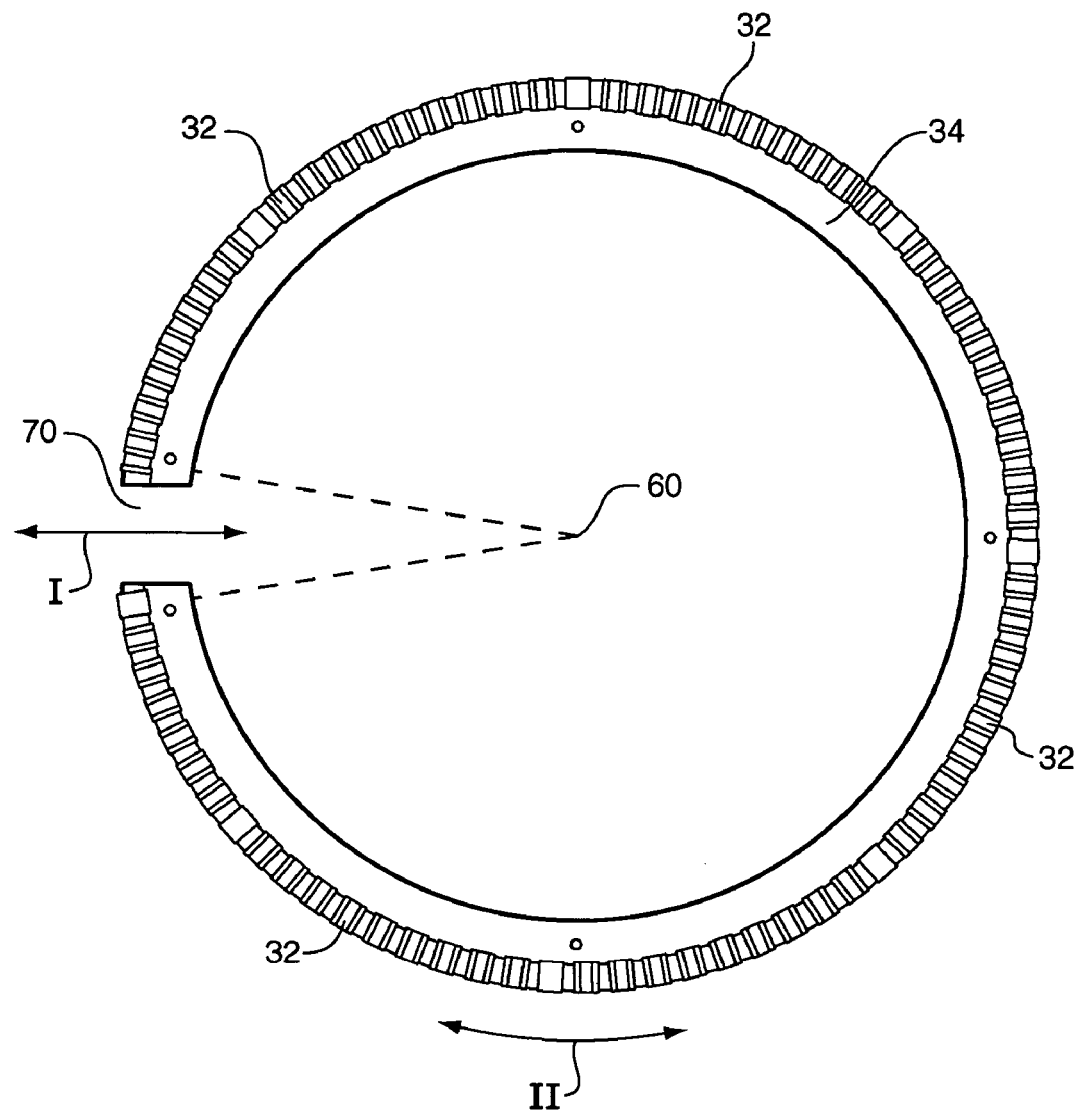
FIG. 7 is a cross-sectional front view of a pedestal device of an object measuring device.

FIG. 7 is a cross-sectional front view of one pedestal device 34. As shown, pedestal device 34, and LEDs 32, do not completely enclose axis 60. Instead, pedestal device 34 is an annular segment with a recess 70 which has no LEDs 32. Recess 70 may simplify handling of an endless profile object, for example (see FIG. 10) because the object can be inserted laterally into, or removed from, passageway 16 through recess 70. The direction of insertion or removal is illustrated with an arrow I.

During operation of pedestal device 34, light emitted from LEDs 32 arranged next to recess 70 is superimposed on the surface of object 18 such that scattering at light edge L is reduced, to increase measurement accuracy. Optionally, pedestal 34 may be made rotatable about axis 60, as indicated by arrow II in FIG. 7. In one embodiment, pedestal device 34 is constructed with structural elements to form slit 46 and/or light blocking element 48 in a monolithic assembly; the monolithic assembly may facilitate movement of device 10, for example along axis 60, or rotating about axis 60. A rotational mechanism (not shown) may be used to rotate this monolithic assembly so that recess 70 can be aligned with a region of an object profile that is subject to less stringent measurement requirements. Should recess 70 encompass a large annular segment to accommodate objects with a large cross section, pedestal device 34 may be rotated to ensure an adequate measurement of the dimensions of the object.

Accordingly, in one embodiment, sensors 22 are rotatably mounted within housing 12 such that their orientation about axis 60 may be selected.

Figure 8:
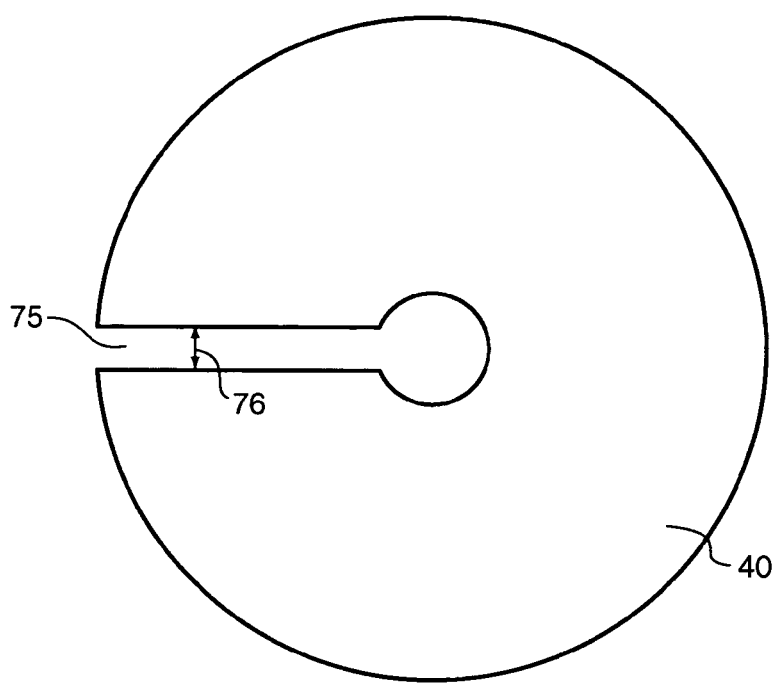
FIG. 8 is a front cross-sectional view of a lower flange plate corresponding to the pedestal device of FIG. 7.

FIG. 8 is a front cross-sectional view of a lower flange plate corresponding to pedestal device 34 of FIG. 7. Lower flange plate 40 has an opening 75 corresponding to recess 70 of pedestal device 34, through which object 18 to be measured can be inserted into device 10, as explained above. Opening 75 has a width 76 that, for example, accommodates object 18 inserted through opening 75 but also reduces effects of stray light. Width 76 is for example 28 mm. In certain embodiments, housing 12 of device 10 may include retractable covers which may be opened to allow insertion of object 18 into passageway 16, and closed to prevent ambient light from entering passageway 16 through opening 75.

By way of example only, object measuring device 10 may be made with the following non-limiting elements and/or operational configurations:

(1) Light emitting elements 32 may be LEDs manufactured by Nichia, type NSPG500S, each LED emitting about 19500 mcd of light at a wavelength of about 520 nm with a 15 degree divergence angle. LEDs. Light emitting elements 32 may be LEDs manufactured by Kingbright, type L53SEC-H, each LED emitting about 10000 mcd of light at a wavelength of about 630 nm with a 30 degree divergence angle.

(2) If device 10 incorporates four sensors 22, 136 LEDs may be used, for example, as light emitting elements 32, to form light edge L. If device 10 incorporates eight sensors 22, 196 LEDs may be used, for example, to form light edge L. The number of sensors 22 may increase if object 18 has a complicated geometrical form, to increase measurement accuracy.

(3) One suitable sensor 22 includes a CCD array with 1024×768 elements. Other suitable sensors include CCD arrays with 1600×1200 elements.

(4) A sensor 22 may operate at a 15 Hz frame rate while image measurement may occur at a 5 Hz frame rate.

(5) An optical device 21 may be an objective lens manufactured by Comsicar.

(6) The bundle of light from light emitters 32 may include wavelengths within the ultraviolet, visible and/or infrared regions.

FIG. 9 shows a graph of light intensity in a transition region of light edge L. Specifically, a light intensity is shown as relative units in a y-axis, and the direction (e.g., direction 39, FIG. 5) of a transition region of the light edge is shown as units of distance in an x-axis. A calculated or interpolated position of light edge L is indicated with P.

Illustratively, sensor 22 may receive scattered light corresponding to three points along light edge L, namely points A, B and C. Depending on an adjustment of light intensity, points B and C will correspond to regions of a surface of object 18 that are illuminated, or are not illuminated, respectively. As shown, the light intensity curve transition region is not abrupt nor erratic, but a ramp having a gradient. Points B and C define the beginning and the end of the transition region; between these points, point A is calculated or interpolated to define a position P of light edge L for subsequent image processing and calculations. The steeper the gradient of the ramp in the transition region (i.e., the closer points B and C are to each other along the x-axis), the more accurate and reliable are the measurement results. The curve shown in FIG. 9 may be optimized through changes to the dimensions of slit 46. For example, a narrower slit 46 leads to a steeper ramp gradient, and lowers the upper curve plateau due to a reduced light intensity. A lengthened construction of one or both slit walls (e.g., walls 50, 51 of FIG. 4) leads to a similar result; but a lengthened construction of edge 55 of light blocking element 48 leads to a steeper ramp gradient without significantly lowering the illumination plateau.

Figure 10:
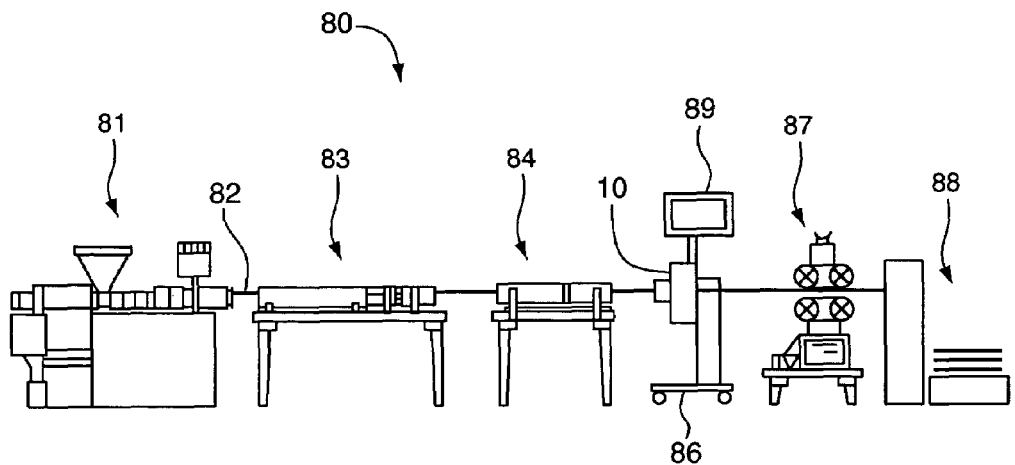
FIG. 10 shows an object measuring device in a finishing line for production of endless profiles.

FIG. 10 shows object measuring device 10 in the context of a finishing line 80 for the production of endless profiles. An analysis subsystem 89 couples with device 10 to process image data to determine dimensions of object 82 (in the form of an endless profile). On the left-hand side of FIG. 10 is an extrusion unit 81, which extrudes an endless profile 82, for example weather-stripping material. To the right of extrusion unit 81 are two cooling devices 83 and 84 which cool endless profile 82, ensuring dimensional stability of the endless profile. Object measuring device 10 and analysis subsystem 89 are positioned between cooling device 84 and a discharge device 87 for dimensional measurement of endless profile 82. Device 10 may be configured to enable a lateral introduction of endless profile 82 (i.e., device 10 may have a recess 70 in pedestal device 34, and a clearance 75 in lower flange plate 40, as shown in FIG. 7 and FIG. 8 respectively). When configured in this manner, device 10 can be integrated, for example, into the production process without interrupting production of endless profile 82, thus avoiding extensive and costly shutdown and startup of extrusion unit 81. Configured in this manner, device 10 can also be moved by means of a rolling carriage 86 among various production finishing lines, so that only a single device 10 suffices to conduct random testing of endless profile dimensions in various production finishing lines. As shown on the right side of FIG. 10, to the right of a discharge device 87 is a packaging device 88 for packaging goods produced with endless profiles.

Accordingly, a device 10 employed in production setting of FIG. 10 may make two to five measurements per second, or another rate compatible with the discharge speed of a production finishing line.

With further regard to FIG. 2, housing 12 may utilize a tubular element 14 that extends outward from lower flange plate 40 parallel to axis 60. The length of tubular element 14 is such that inadvertent insertion of hands of operating personnel into tubular element 14 (and thus, into the region where light edge L is generated on the surface of the object 18) is prevented. This, in turn, prevents mechanical interference during measurement operations. Tubular element 14 may also reduce stray light entering passageway 16, preserving high contrast between points B and C (FIG. 9) on a surface of object 18 in the presence of ambient light.

Figure 12:
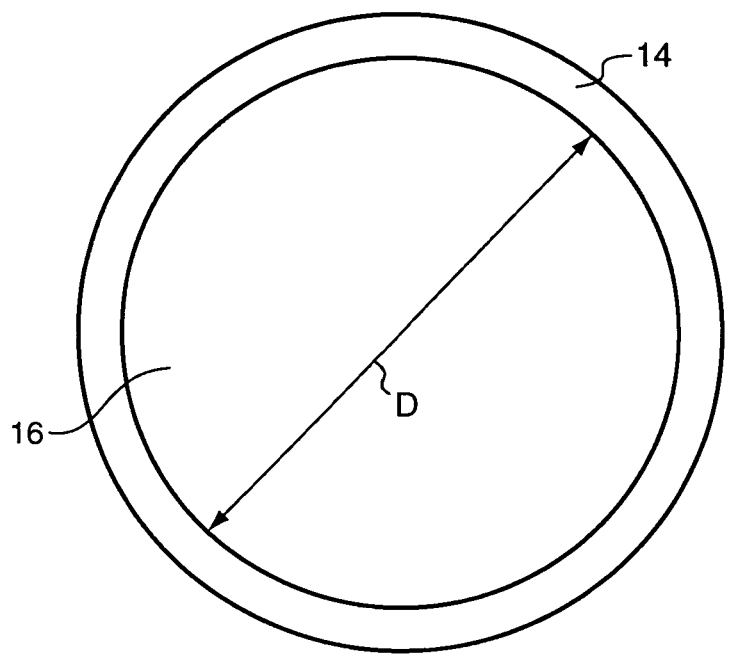
FIG. 12 shows one exemplary cross-sectional shape of a passageway within an object measuring device.

Referring again to FIG. 2, the size of passageway 16 is a matter of design choice. For example, smaller passageways may be used to measure small objects with high precision, and larger passageways may be used to accommodate larger objects. Passageway 16 may for example have a circular cross-section of 60 mm, 80 mm or 100 mm diameter; an elliptical cross section with 40 mm and 80 mm major and minor dimensions; a rectangular cross section with 70 mm and 120 mm dimensions; or a square cross-section with a 70 mm width. For purposes of illustration, FIG. 12 shows one circular cross-section of passageway 16 with a diameter D (for example, 80 mm).

In other embodiments, components may be interchanged to adapt device 10 for the measurement of objects 18 of different sizes or other properties. For example, in these embodiments, upper flange plate 36 and pedestal device 34 may be removable, with pedestal device 34 replaceable by another pedestal device having a different number or type of LEDs 32. Lower flange plate 40 may be removable and replaceable with a lower flange plate with a different sized passageway 16 (for example a first lower flange plate with opening for passageway 16 of 60 mm and a second lower flange plate with an opening for passageway 16 of 80 mm). Upper and lower flange plates 36 and 40 and pedestal device 34 may be removable and replaceable so that device 10 no longer has a recess 70. When components are interchanged, device 10 may be recalibrated.

Certain embodiments may also include a blower (not shown) to provide air current to inner parts of the device (e.g., within passageway 16). If the object to be measured is, for example, an extruded product made from plastic material, and moisture or chemicals outgas from the object as a result of high temperature, the air current may prevent dispersion of the moisture or chemicals within passageway 16, thereby improving measurement accuracy and preventing deposition of unwanted materials on surfaces.

Figure 11:
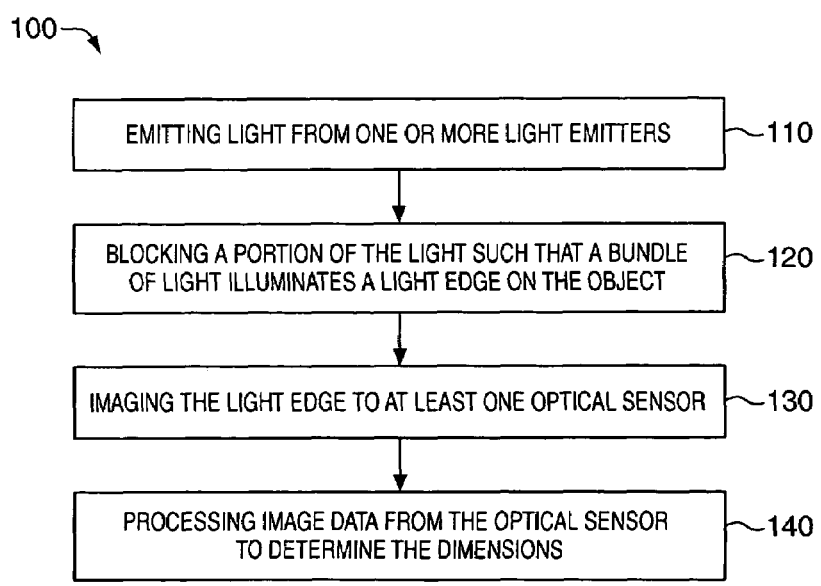
FIG. 11 is a flowchart of a method for measuring dimensions of an object

FIG. 11 is a flowchart of one process 100 for measuring dimensions of an object. Process 100 is for example performed by object measuring device 10, FIG. 2. In step 110, light is emitted from one or more light emitters (e.g., emitters 32). In step 120, a portion of the light is blocked such that a bundle of light (e.g., bundle 37, FIG. 5) illuminates a light edge (e.g., light edge L) on the object. In step 130, the light edge is imaged to at least one optical sensor (e.g., optical device 21 and sensor 22). In step 140, image data from the optical sensor is processed (e.g., by triangulation) to determine the dimensions.

Figure 1:
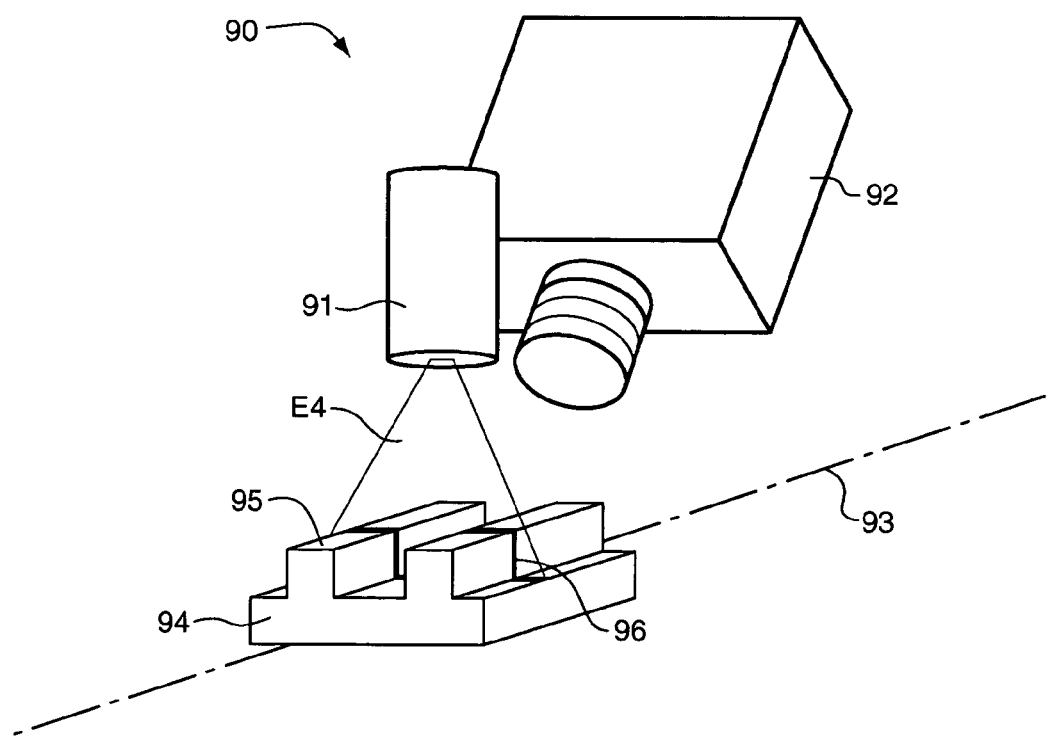
FIG. 1 shows a prior art device for measuring the dimensions of an object.

Steps 110, 120 of emitting and blocking may for example include aligning the light bundle in a plane perpendicular to an axis of movement (e.g., axis 60, FIG. 1) between the object and the light emitters. The steps 110, 120 of emitting and blocking may for example include aligning the bundle of light along a light ray, such that imaging step 130 images the light edge along a line of sight to the optical sensor, wherein the light ray forms an oblique angle with the line of sight.

Optionally, another step of process 100 may include the step of moving the object or object measuring device along an axis of movement to change measurement location of the object relative to the optical measuring device.

Figure 13:
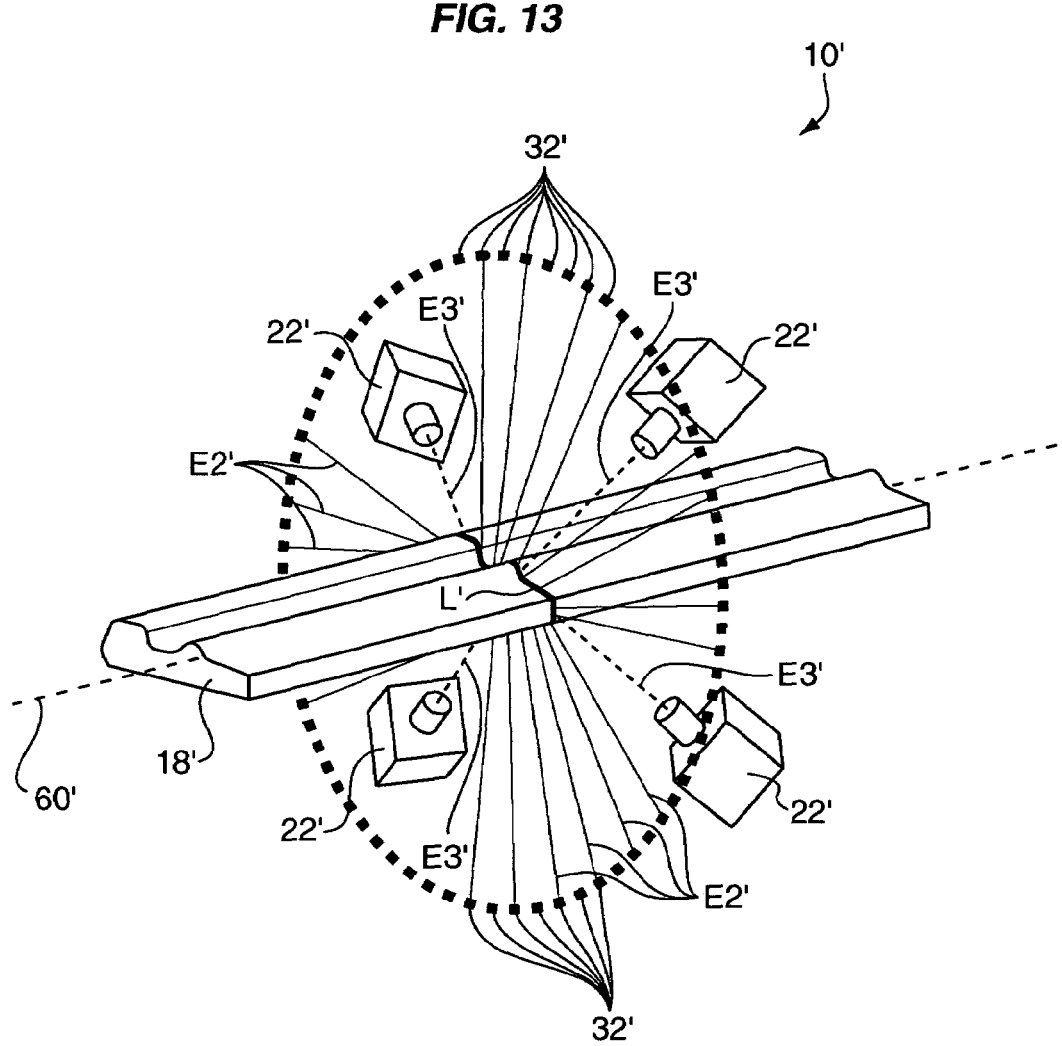
FIG. 13 illustrates an off-axis view of one object measuring device embodiment with a plurality of light emitters and a plurality of sensors arranged about a center axis.

FIG. 13 illustrates an off-axis view of one object measuring device 10', shown only with a plurality of light emitters 32' and a plurality of sensors 22' arranged about center axis 60'. Exemplary light rays E2' are shown emitted from emitters 32' to light edge L' on object 18' (not all of the light emitters 32' and light rays E2' are labeled, for clarity of illustration). Light blocking elements (e.g., elements 38, 44, 48) are for example used to align light into light bundles along light rays E2', but are also not shown in FIG. 13 for purposes of illustration. Light edge L' is then imaged, in this example, by four sensors 22' along lines of sight E3'.

Figure 14:
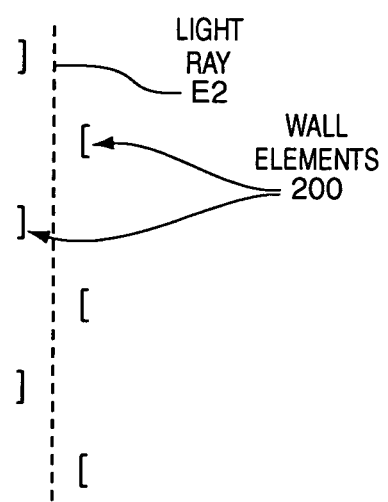
FIG. 14 shows exemplary an embodiment of a light blocking element formed of wall elements.

It should be apparent that certain changes may be made without departing from the scope hereof. For example, slit 47 may be formed of a single structural element. In another example, fiber optics may connect to a single light source to form the plurality of light emitting devices 32. In still another example, optical devices such as a mirror, fiber optic elements, a lens, gradient index optics, and/or combinations thereof, may be utilized so as to reorient light ray E2 and/or line of sight E3. For example, use of such optical devices may permit repositioning of sensors and optical devices 22, 21, and/or light emitters 32, to accommodate desired packaging of object measuring device 10. Thus it may be further understood that light ray E2 is illustrative of that portion of light (the light bundle) actually directed to the object; for example, light from a light emitter may be initially directed along a desired direction (for example parallel to central axis 60, FIG. 1) and then redirected with a mirror (or other optical device) towards the object (and, in this example, along E2). In yet another example, light emitters 32 may be disposed in different shapes about the axis of movement between object measuring device 10 and object 18; such shapes for example include, without limitation, a line, a polygon and an oval or circle. In still another example, the light blocking element which forms bundle of light may be formed from a plurality of wall elements which cooperate to form a slit; FIG. 14 shows exemplary wall elements 200 which, for example, couple with housing 12 to form the slit about a light ray E2" in forming the light bundle at the object.

It should thus be noted that the matter contained in the above description or shown in the accompanying drawings should be interpreted as illustrative and not in a limiting sense. For example, when words such as "parallel" and "perpendicular" are used, that these may also include, respectively, essentially or approximately parallel and perpendicular geometry. The following claims are intended to cover all generic and specific features described herein, as well as all statements of the scope of the present method and system, which, as a matter of language, might be said to fall there between.

What is claimed is:

1. An object measuring device for measuring one or more dimensions of an object, comprising:
   one or more light emitters for directing light towards the object;
   first and second light blocking elements that form a slit between the object and the light emitters, wherein a portion of light from the light emitters passes through the slit toward the object;
   a third light blocking element between the slit and the object, to block light passing through the slit to form a bundle of light that forms at least one light edge on the object; and
   at least one sensor that captures an image of the light edge, wherein the dimensions may be determined from image data of the sensor.

2. The object measuring device of claim 1, further comprising an analysis subsystem for processing the image data to determine the dimensions.

3. The object measuring device of claim 2, the analysis subsystem utilizing triangulation to determine the dimensions.

4. The object measuring device of claim 1, the light emitters emitting electromagnetic radiation from at least one of the ultraviolet, visible range, and infrared spectrums.

5. The object measuring device of claim 1, the light emitters comprising one or more light generating devices selected from a group consisting of light emitting diodes, incandescent light sources, and fluorescent light sources.

6. The object measuring device of claim 1, the light emitters comprising one or more optical devices.

7. The object measuring device of claim 6, the light emitters comprising a light generating source that generates light for a plurality of the optical devices.

8. The object measuring device of claim 6, the optical devices comprising at least one of an optical fiber, a mirror, gradient index optics, a lens, and mixtures thereof.

9. The object measuring device of claim 1, wherein at least one of the object and light emitting device is configured to move, relative to one another, along an axis.

10. The object measuring device of claim 1, the light emitters comprising a plurality of light emitters arranged around an axis.

11. The object measuring device of claim 10, wherein at least one of the object and the object measuring device is configured for movement along the axis.

12. The object measuring device of claim 11, the light emitters being arranged circumferentially around the axis.

13. The object measuring device of claim 11, the plurality of light emitters being disposed symmetrically around the axis.

14. The object measuring device of claim 11, the plurality of light emitters disposed in one of a polygonal and circular shape around the axis.

15. The object measuring device of claim 10, the light emitters being arranged in an array comprising a radial recess.

16. The object measuring device of claim 10, the light emitters and light blocking elements being rigidly fixed to each other.

17. The object measuring device of claim 16, the light emitters and light blocking elements being rotatable about the axis.

18. The object measuring device of claim 1, the light emitters comprising a plurality of light emitters being disposed in a linear shape.

19. The object measuring device of claim 1, the sensor comprising a plurality of sensors arranged around an axis.

20. The object measuring device of claim 19, wherein one of the object and the object measuring device is configured for movement along the axis.

21. The object measuring device of claim 1, the third light blocking element being within 150 mm from a surface of the object.

22. The object measuring device of claim 21, the third light blocking element being within 70 mm from the surface.

23. The object measuring device of claim 1, the first and second light blocking elements being integrally formed within a common rigid structure.

24. The object measuring device of claim 1, a removable and replaceable flange plate forming the second and third light blocking elements.

25. The object measuring device of claim 1, further comprising at least one optical device to direct light reflected from the light edge to the sensor.

26. The object measuring device of claim 1, further comprising a housing for coupling together the light emitters, the light blocking elements and the sensor, the housing forming a passageway for the object.

27. The object measuring device of claim 1, the device being operable for continuous dimensional measurement of endless profiles.

28. The object measuring device of claim 1, the light emitters emitting either incoherent or coherent electromagnetic radiation.

29. The object measuring device of claim 1, the sensor being disposed in a plane enclosing an oblique angle with an axis of relative movement between the object and the object measuring device, for sensing light reflected from the light edge.

30. The object measuring device of claim 1, the sensor sensing light reflected from the light edge at an oblique angle to an axis of relative movement between the object and the object measuring device.

31. The object measuring device of claim 29, the axis being essentially parallel with a central axis of the object measuring device.

32. The object measuring device of claim 1, a transition region of the light edge being less than 300 microns.

33. The object measuring device of claim 32, the transition region being less than 50 microns.

34. The object measuring device of claim 1, each sensor comprising an optical device for directing reflected light from the light edge to the sensor.

35. The object measuring device of claim 34, the optical device comprising an objective lens.

36. The object measuring device of claim 35, the optical device comprising a filter for transmitting selected wavelengths of light to the sensor.

37. The object measuring device of claim 34, the optical device comprising one or both of mirrors and optical fiber bundles, to direct light from different parts of the light edge to the sensor.

38. The object measuring device of claim 1, further comprising a blower for generating air currents within the device.

39. The object measuring device of claim 1, the light emitters and light blocking elements cooperating to align the light bundle in a plane perpendicular to an axis of movement between the object and the light emitters.

40. The object measuring device of claim 1, the light blocking elements comprising a plurality of wall elements, positioned and staggered to one another, to form the slit.

41. A method for measuring dimensions of an object, comprising:
    emitting light from one or more light emitters;
    blocking a portion of the light with first and second light blocking elements forming a slit therebetween, such that a portion of light from the light emitters passes through the slit towards the object;
    utilizing a third light blocking element between the slit and the object to form a bundle of light that illuminates a light edge on the object;
    imaging the light edge to at least one optical sensor; and
    processing image data from the optical sensor to determine the dimensions.

42. The method of claim 41, further comprising moving at least one of the object and the light emitters along an axis of relative movement between the object and the light emitters.

43. The method of claim 42, the step of moving comprising moving an endless profile along the axis.

44. The method of claim 41, the step of emitting light comprising generating light from a plurality of LEDs arranged around an axis.

45. The method of claim 41, the step of emitting light comprising transmitting light through one or more optical fibers.

46. The method of claim 41, the step of processing image data comprising utilizing triangulation.

47. The method of claim 41, the steps of emitting, blocking and utilizing comprising aligning the light bundle in a plane perpendicular to an axis of movement between the object and the light emitters.

48. The method of claim 41, the steps of emitting, blocking and utilizing comprising aligning the bundle of light along a light ray, the step of imaging comprising imaging the light edge along a line of sight to the optical sensor, wherein the light ray forms an oblique angle with the line of sight.

49. A process for measuring dimensions of an object, comprising:
    moving either an object or an object measuring device along an axis of movement,
    generating light from the object measuring device and blocking a portion of the light with first and second light blocking elements that form a slit therebetween, so that a portion of light from the light emitters passes through the slit towards the object;
    utilizing a third light blocking element between the slit and the object to form a bundle of light that illuminates the object to form a light edge on the object;
    imaging the light edge to an optical sensor of the object measuring device; and
    processing image data from the optical sensor to determine the dimensions.

* * * * *